US011816110B2

(12) United States Patent
Beier et al.

(10) Patent No.: US 11,816,110 B2
(45) Date of Patent: Nov. 14, 2023

(54) PROCESSING LARGE QUERY RESULTS IN A DATABASE ACCELERATOR ENVIRONMENT

(71) Applicant: INTERNATIONAL BUSINESS MACHINES CORPORATION, Armonk, NY (US)

(72) Inventors: Felix Beier, Haigerloch (DE); Knut Stolze, Hummelshain (DE); Reinhold Geiselhart, Rottenburg-Ergenzingen (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/658,870

(22) Filed: Apr. 12, 2022

(65) Prior Publication Data
US 2022/0405289 A1 Dec. 22, 2022

(51) Int. Cl.
*G06F 17/30* (2006.01)
*G06F 16/245* (2019.01)
*G06F 16/25* (2019.01)
*G06F 16/28* (2019.01)
*G06F 16/22* (2019.01)

(52) U.S. Cl.
CPC .... *G06F 16/24569* (2019.01); *G06F 16/2282* (2019.01); *G06F 16/252* (2019.01); *G06F 16/258* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,862,625 B2 10/2014 Meiyyappan
9,213,735 B1 * 12/2015 Gudmundson ......... G06F 9/547
(Continued)

FOREIGN PATENT DOCUMENTS

CN 106716409 A 5/2017

OTHER PUBLICATIONS

Beier, et al., "Processing Large Query Results in a Database Accelerator Environment," Application and Drawings, Filed on Jun. 14, 2022, 44 Pages, Related PCT Patent Application Serial No. PCT/IB2022/055506.
(Continued)

*Primary Examiner* — Hung D Le
(74) *Attorney, Agent, or Firm* — Teddi E. Maranzano

(57) ABSTRACT

A computer-implemented method for facilitating large data transfers from a first data management system to a second data management system is disclosed. The method comprises receiving data from the first data management system by a first buffer component, rerouting, upon the first buffer component reaching a predefined fill-level, dynamically the received data to a second buffer component, wherein the second buffer component is adapted to process the rerouted received data, forwarding, by the second buffer component, the rerouted data once the first buffer component is again ready for receiving the rerouted data from the second buffer component, and sending, by a sending component, the data buffered in the first component to the second data management system.

20 Claims, 8 Drawing Sheets

(56) References Cited

U.S. PATENT DOCUMENTS

| | | | |
|---|---|---|---|
| 9,621,331 B2* | 4/2017 | Zhou | G06F 13/385 |
| 10,198,050 B2* | 2/2019 | Ding | H04L 41/069 |
| 10,509,592 B1* | 12/2019 | Malwankar | G06F 3/0685 |
| 10,747,773 B2 | 8/2020 | Yoshida | |
| 10,803,066 B2 | 10/2020 | Shau | |
| 11,030,063 B1* | 6/2021 | Shipilov | G06F 3/067 |
| 11,057,464 B1* | 7/2021 | Wei | G06F 3/0656 |
| 11,461,030 B2* | 10/2022 | Chen | G06F 3/0647 |
| 2002/0196743 A1 | 12/2002 | Thalanany | |
| 2004/0267983 A1 | 12/2004 | Oda | |
| 2010/0023655 A1* | 1/2010 | Hirayama | G06F 3/0656 |
| | | | 710/33 |
| 2015/0098114 A1* | 4/2015 | Morino | H04N 1/32454 |
| | | | 358/1.16 |
| 2016/0232206 A1 | 8/2016 | Hayamizu | |
| 2016/0321153 A1* | 11/2016 | Zhang | G06F 11/22 |
| 2016/0350292 A1* | 12/2016 | Yu | G06F 16/214 |
| 2017/0116313 A1* | 4/2017 | Roytman | G06F 16/283 |
| 2017/0213257 A1* | 7/2017 | Murugesan | G06Q 30/0275 |
| 2018/0069658 A1* | 3/2018 | Benisty | H03M 13/15 |
| 2021/0141794 A1 | 5/2021 | Picorel | |
| 2021/0286752 A1* | 9/2021 | Modukuri | G06F 13/4022 |
| 2022/0286441 A1* | 9/2022 | Kuehnel | H04L 63/126 |

OTHER PUBLICATIONS

International Searching Authority, "Notification of Transmittal of the International Search Report and the Written Opinion of the International Searching Authority, or Declaration," Patent Cooperation Treaty, Aug. 29, 2022, 7 pages, International Application No. PCT/IB2022/055506.

Beier, et al., "Processing Large Query Results in a Database Accelerator Environment," Application and Drawings, Filed on Jun. 22, 2021, 44 Pages, Related US Patent Application Serial No. 21180943.9.

* cited by examiner

```
100
```

| 102 | receiving data from the first data management system |

| 104 | upon a first buffer component reaching a predefined fill-level, rerouting dynamically the received data to a second buffer component |

| 106 | forwarding the rerouted data once the first buffer component is again ready for receiving |

| 108 | sending the data buffered in the first buffer component to the second data management system |

FIG. 1

PROCESSING LARGE QUERY RESULTS IN A DATABASE ACCELERATOR ENVIRONMENT

BACKGROUND

The invention relates generally to a method for facilitating large data transfers, and more specifically, to a computer-implemented method for facilitating large data transfers from a first data management system to a second data management system. The invention relates further to a data transfer system for facilitating large data transfers from a first data management system to a second data management system, and a related computer program product.

Nowadays, more and more complex transaction systems, related data management, super-large databases, as well as, decoupled (or in other cases integrated) OLTP (online transaction processing)/OLAP (online analytical processing) requirements belong to the daily challenges of IT (information technology) organizations of enterprises. In an accelerated relational database system, analytical queries are typically run on a database accelerator to provide a significant performance benefit for analytical query processing. There remains only a small influence on the OLTP portion, so that the OLTP portion of the data processing system can work without too great an influence of OLAP requirements. Therefore, analytical queries are typically offloaded to the accelerator, forwarded to a specialized backbone database management system (DBMS) which is optimized for intensive analytical workloads and query results are passed back to the client application. This offloading must be completely transparent to the application working against the OLTP portion of the database. I.e., different behaviors of the accelerated DBMS and the backend DBMS need to be compensated by an adapter component that, e.g., converts result data from the backend format it into the format that is expected by client applications.

Typical analytical query result sets are meant to be stored and used by a user without additional complex post-processing analysis steps. The accelerator server application, which acts as an adapter for the backend database, converts and forwards the data and is optimized for the processing of such small result sets which usually only comprise a few rows.

Database operators are faced with a different scenario when executing a query that may produce a result set that is to be further analyzed and/or reduced by the data consumer, i.e., the client application that connects to the accelerated database. In the extreme case, when a table or large join results are contained in such a result set, it can easily exceed 100's of GB of data. This scenario may be named "large-result-set scenario".

Unlike the typical small-result-set scenario, such large result sets need special treatment because significant amount of processing time and resources are needed for or by the database adapter component that would be neglectable otherwise. I.e., for small result sets, the execution of the query inside the backend DBMS dominates the whole data processing pipeline. In contrast, for large query results, the database adapter needs to fetch many rows from the backend DBMS, convert it to the target format, and send it to the accelerated DBMS (i.e., the OLAP portion).

There are several disclosures related to a method for operating a database and a related accelerator. US Patent Publication 20210141794 Å1 discloses a "system comprising a server associated with a database comprising a plurality of tuples. The server includes a processing circuitry for executing a query engine configured to receive a query comprising one or more operators. The server is further configured for propagating the operator(s), and optionally, the condition(s) to a memory management module which is adjusted to process the plurality of tuples received from a storage medium storing the database and return each complying tuple which complies to the operator." Furthermore, US Patent Publication 20160232206 Å1 discloses "a second query execution part is added to a database management system, comprising a first query execution part configured to execute a query based on a query execution plan of a query to a database and to return a query execution result to the query issuance source and a buffer management part configured to read data of a read request from the database to store the data into the buffer and to provide the data to an issuance source of the read request if the data of a read request has not been stored in the buffer."

However, none of these publications solve the problem of required manual tuning, buffer overflows and/or a stop of the backend system due to buffer overflows when operating a data management system together with a backend system operating as a query accelerator.

In order to address this conflict, a couple of techniques have been developed which are mainly based on a buffering of data in the adapter component. However, such intermediate buffering may need sophisticated knowledge of the data flow from the backend system to the OLTP portion (i.e., the accelerated database) and a large amount of heuristic tuning. This process is error prone and may lead to buffer overflows, or—in the worst case—to a processing interruption or major delay of the backend DBMS. The situation is unacceptable, so that a need may exist to overcome this situation with a self-tuning of the adapter component in order to address both, the large-result-set scenario as well as the small-result-set scenario.

SUMMARY OF THE INVENTION

According to an aspect of the present invention, a computer-implemented method for facilitating large data transfers from a first data management system to a second data management system may be provided. The method may comprise receiving data from the first data management system by a first buffer component and rerouting, upon the first buffer component reaching a predefined fill-level, dynamically the received data to a second buffer component, wherein the second buffer component is adapted to process the rerouted received data. The method may further comprise forwarding, by the second buffer component, the rerouted data once the first buffer component is again ready for receiving the rerouted data from the second buffer component, and sending, by a sending component, the data buffered in the first buffer component to the second data management system.

According to another aspect of the present invention, a data transfer system for facilitating large data transfers from a first data management system to a second data management system may be provided. The system may comprise a processor and a memory communicatively coupled to the processor, wherein the memory stores program code portions that, when executed, enable the processor to receive data from the first data management system by a first buffer component and reroute, upon the first buffer component reaching a predefined fill-level, dynamically the received data to a second buffer component, wherein the second buffer component is adapted to process the rerouted received data.

The processor, when executing the program code portions, may further be enabled to forward, by the second buffer component, the rerouted data once the first buffer component is again ready for receiving the rerouted data from the second buffer component, and to send, by a sending component, the data buffered in the first buffer component to the second data management system.

The proposed computer-implemented method for facilitating large data transfers from a first data management system to a second data management system may offer multiple advantages, technical effects, contributions and/or improvements:

Generally, the method proposed here, and system may solve the above-mentioned conflict by providing a solution for existing problems with existing spill-to-disk implementations. In particular, the conflict between fast- or slow-fetching (equivalent to the large-result-set scenario vs. the small-result-set scenario) may successfully be addressed. Basically, no additional configuration of an adapter between the first data management system and the second data management system may be required. This is due to the superior characteristic of the here proposed solution. Both workload types are gracefully handled. Operators do not need to set, reset and/or refine/fine-tune parameter values; a certain mix of workload types is assumed for the first database. There is no need to touch any threshold sizes or delay values until spilling is triggered or a number of concurrent queries that must be active to indicate resource shortage.

No special precaution may need to be made, and interactive application scenarios in which large-result set queries may occur in conjunction with slow-fetching clients. Hence, the backend database—i.e., the first data management system—may deliver its results without an interruption and without any risk of buffer overflows.

Due to the large number of possible configuration values, it has been very challenging in practice and may cause a lot of workload and analysis effort by support engineers that have been responsible to tune an accelerator installation for a customer's workload. With the solution proposed here, such scenarios have become history because global accelerator server configurations may now be operated out-of-the-box for any client query without major configuration efforts. A continuous alternating data path—depending on the type of result set delivered from the first data management system—a conversion of the query results into the client format may always be possible.

It may also become obsolete to discard the result sets after canceling a query which may have massively wasted resources for processing rows that will never be fetched for (i) converting result set rows into the client format, (ii) for compressing converted rows before they are stored on disk, and (iii) for storing rows in the filesystem.

The concept of deciding automatically between a bypass data path—mainly used for small-result-set scenarios—and a more sophisticated spillover data path—mainly used for large-result-set scenarios in which buffer overflow situation may arise—may build one of the core concepts proposed here. And, if the spillover data path is not required, basically no resource consumption may happen because the related threads are stopped and the buffers lying on this data path are not needed.

Hence, the concept proposed here significantly supports the reduction of required computing resources as well as the requirement of fine-tuning configuration parameters and finally eliminate the risk of buffer overflows.

In the following, additional embodiments of the inventive concept—applicable for the method as well as for the system—will be described.

According to an embodiment of the method, the first data management system may be optimized for analytical workload; and according to another useful embodiment of the method, the second data management system may be adapted for receiving queries from a software application. Hence, the two data management systems—e.g., both being implemented as database management systems of different flavor—may each be optimized for a specific task. The second database management system may be optimized for interacting in an OLTP fashion with applications, whereas the first database management system may support, i.e., accelerating, the second database management system in case of OLAP queries. These may be offloaded from the second database management system to the first database management system for execution.

According to a preferred embodiment of the method, the processing of the rerouted received data by the second buffer component may comprise compressing the rerouted received data, storing the compressed rerouted received data, and decompressing the rerouted received data. This way, the spill-over buffer, in which the rerouted received data may immediately be stored, may only require a reduced or little storage capacity and thus only limited system resources.

According to an optimized embodiment of the method, the compressing, storing and decompressing the rerouted received data may be performed by one or more processing threads in an interleaved manner for packets of the rerouted received data. Although the processing may happen in a serialized form for one data block, the processing may be performed in parallel for different data blocks. This may increase the overall performance of the processing of the rerouted data. Because the amount of data in this processing branch may be huge if compared to the direct—or bypass route—it may be instrumental to enable a high throughput in the spillover data route in order to allow the first database management system sending its query results with the highest performance possible. This way, also the large-result-set scenario does not represent a bottleneck for the coupling of the first and second database system.

According to an advantageous embodiment of the method, the one or more processing threads of the second buffer component may be idle while not receiving any rerouted received data from the first buffer component. Hence, if the data path is set to use the bypass route, no resource consumption may happen on the spillover data path and no heuristic parameter setting may be required for a customization of a selection of the different data paths.

According to another preferred embodiment of the method, the first buffer component may be adapted to convert the received data according to predefined requirements of the second data management system. This useful step may shape the data received from the second database management system as if a query had been made against the second database management system. Hence, the data received from the first database management system may be passed to the application without any additionally required conversions. This may help to keep the performance level of the second database management system as high as possible.

According to an additionally preferred embodiment of the method, the second data management system may be a row-oriented relational database system. Experience shows that this type of data management system may be optimized as data backend for OLTP applications.

In contrast and according to one another preferred embodiment of the method, the first data management system may be a column-oriented database management system. Experience also shows that this type of data management system may have very good characteristics for OLAP type requirements. Dedicated data management systems and data organizations being optimized for analytical workloads may be used in which the data may be organized column-wise instead of row-wise.

According to an enhanced embodiment, the method may also comprise determining a data rate of data being transferred out of the first buffer component for a determination whether the first buffer component may again be ready for receiving the rerouted data from the second buffer component. It could be shown that this strategy may be superior to just measuring the fill-level of the first buffer component. Also measuring the transfer(-out) rate of the first buffer component may help to operate the first data management system at maximum performance levels and avoid buffer overflows in the interface between the first data management system and the second data management system.

According to another advance embodiment of the method, a sequence—or sorting—of data being transmitted from the first buffer component may correspond to a query that triggered the receiving data from the first data management system by a first buffer component. This may, in particular, be a helpful feature, if the query from the second data management system to the first data management system may rely on an ordering of the query result set data records; i.e., if a SQL statement comprising " . . . ORDER BY . . . " may have been used.

According to a further developed embodiment of the method, the second buffer component may comprise a data path comprising at least one component out of the group comprising a compression buffer, a compressor thread, a spilling file write buffer, a spilling file writer thread, a spilling file queue, a spilling file reader thread, a decompression buffer, and a decompressor thread. Hence, the data path of the second buffer component may enable a flexible way to process the rerouted data in order to avoid buffer overflows and enable high data throughput out of a high-performing first data management system.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings:

FIG. 1 shows a block diagram of an embodiment of the inventive computer-implemented method for facilitating large data transfers from a first data management system to a second data management system.

Figure 2:
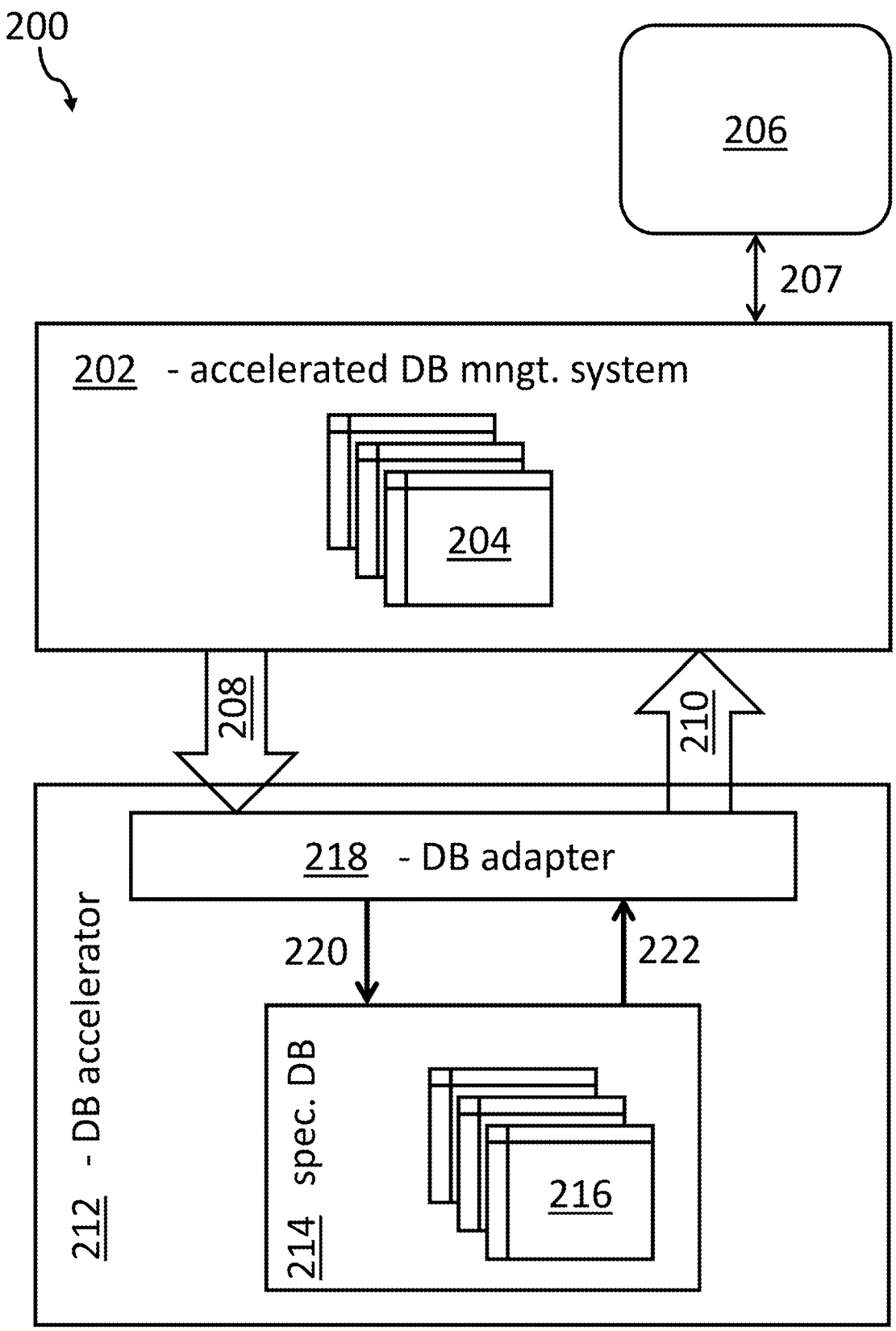

FIG. 2 shows a block diagram of an embodiment of a first data management system connected to a second, accelerated data management system.

Figure 3:
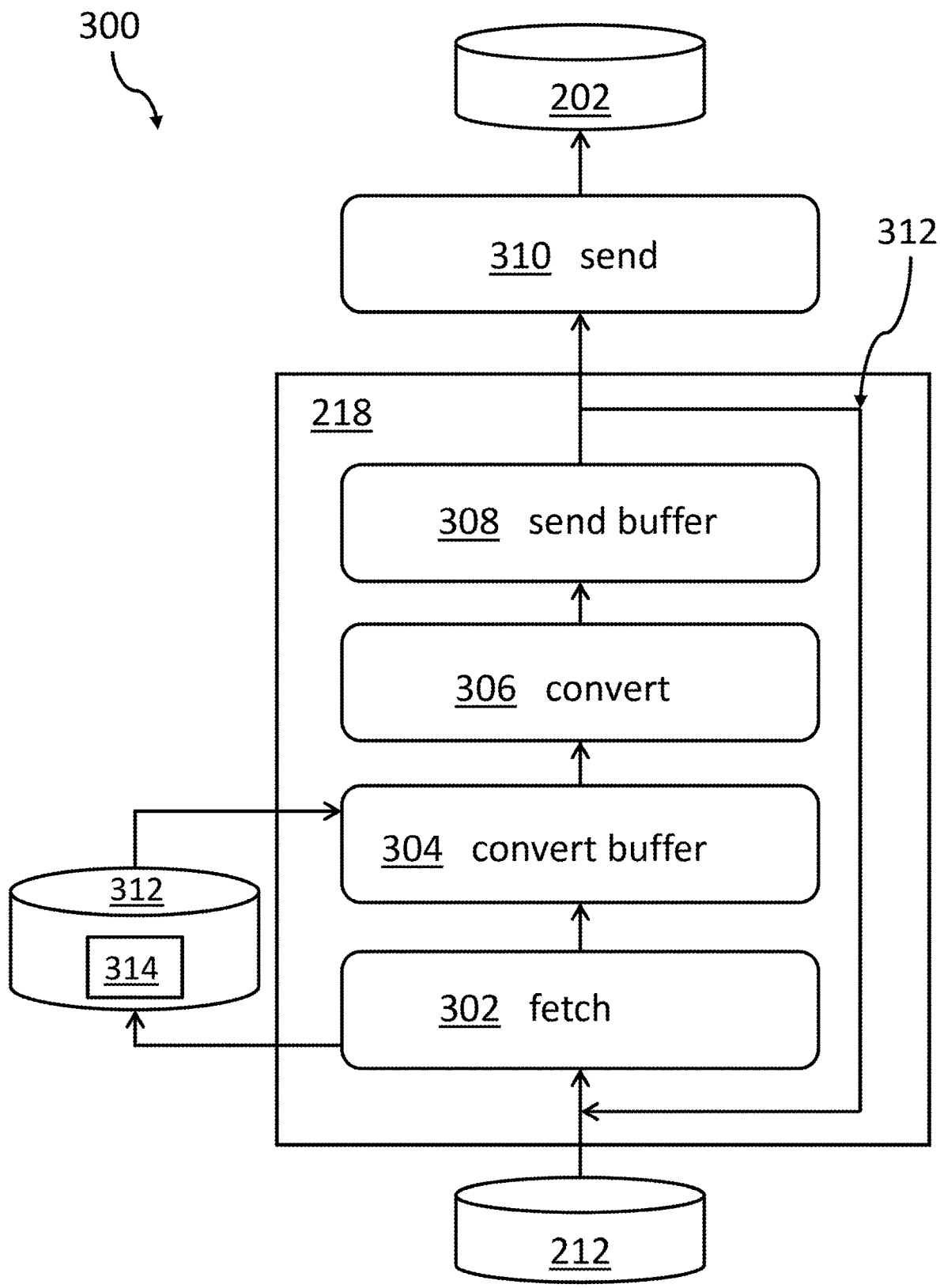

FIG. 3 shows a block diagram of an embodiment of general functional blocks of the adapter between the first and second data management system.

Figure 4:
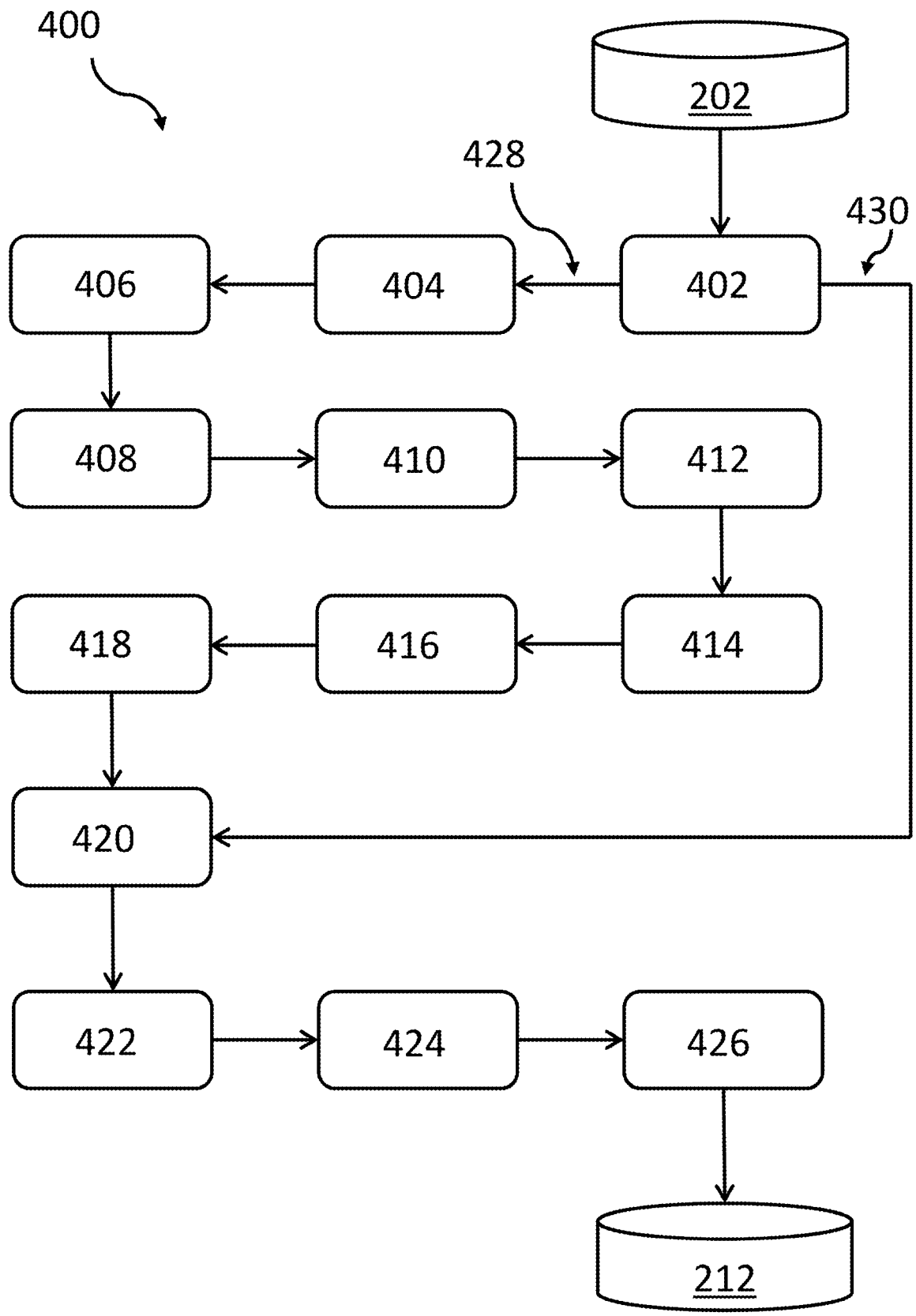

FIG. 4 shows a block diagram of an embodiment of more detailed functional blocks of a portion of the adapter between the first and second data management system.

Figure 5:
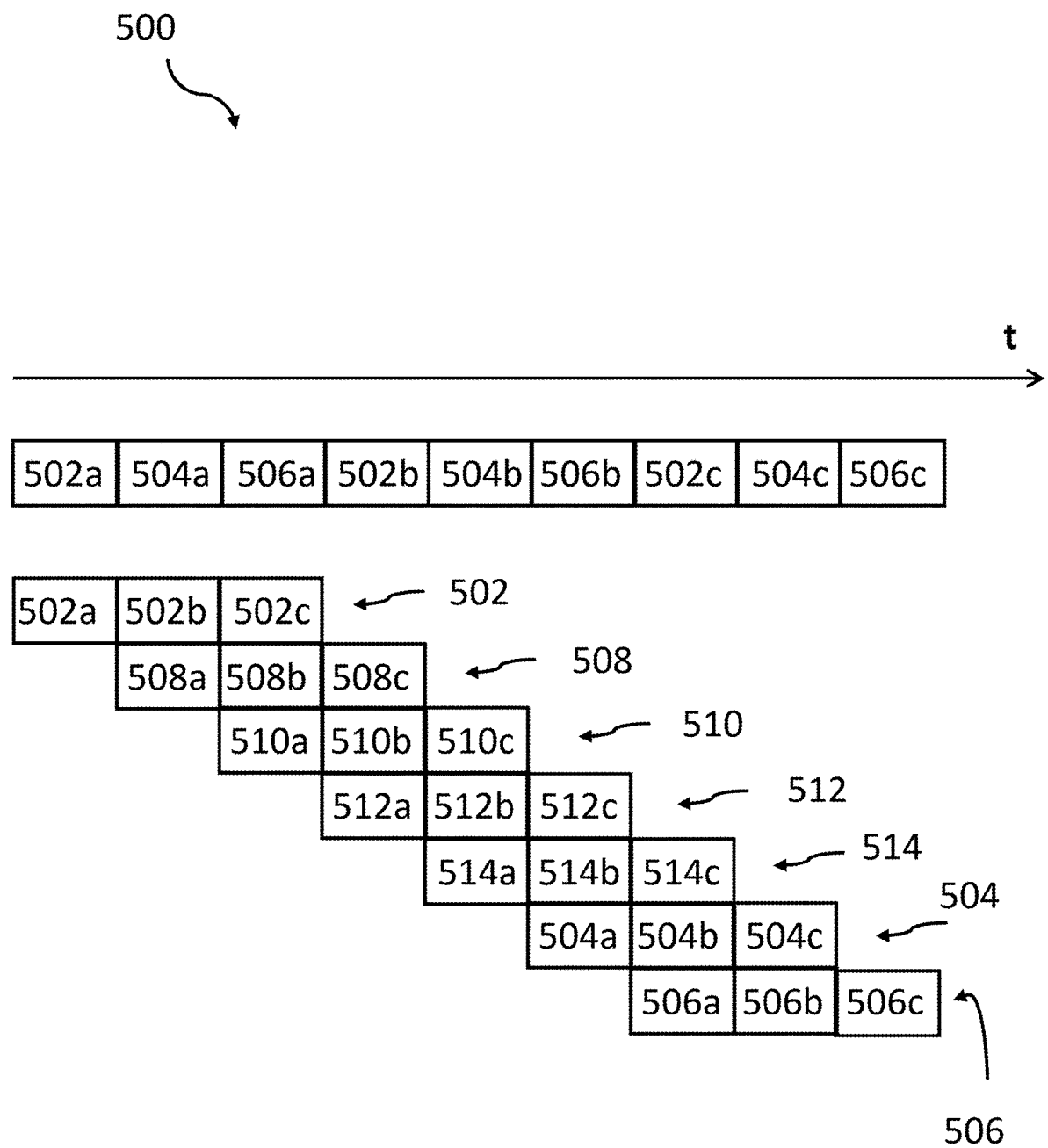

FIG. 5 shows a block diagram of an embodiment of the parallel executing data paths—i.e., the serial and a synchronous result set fetching mechanism with a spill-to-disk function—in accordance with the proposed concept.

Figure 6:
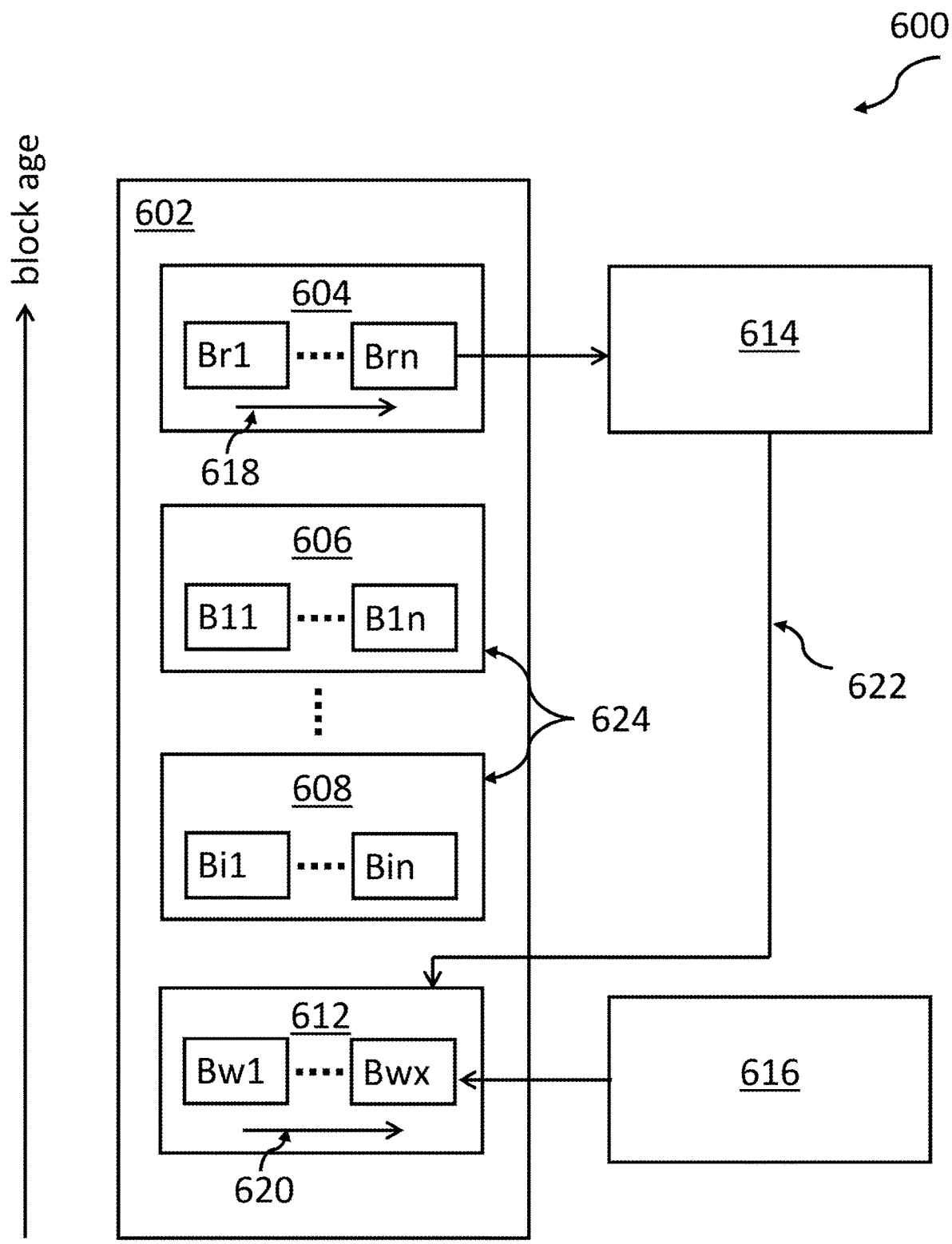

FIG. 6 shows a block diagram of the FIFO spill file set according to a possible implementation.

Figure 7:
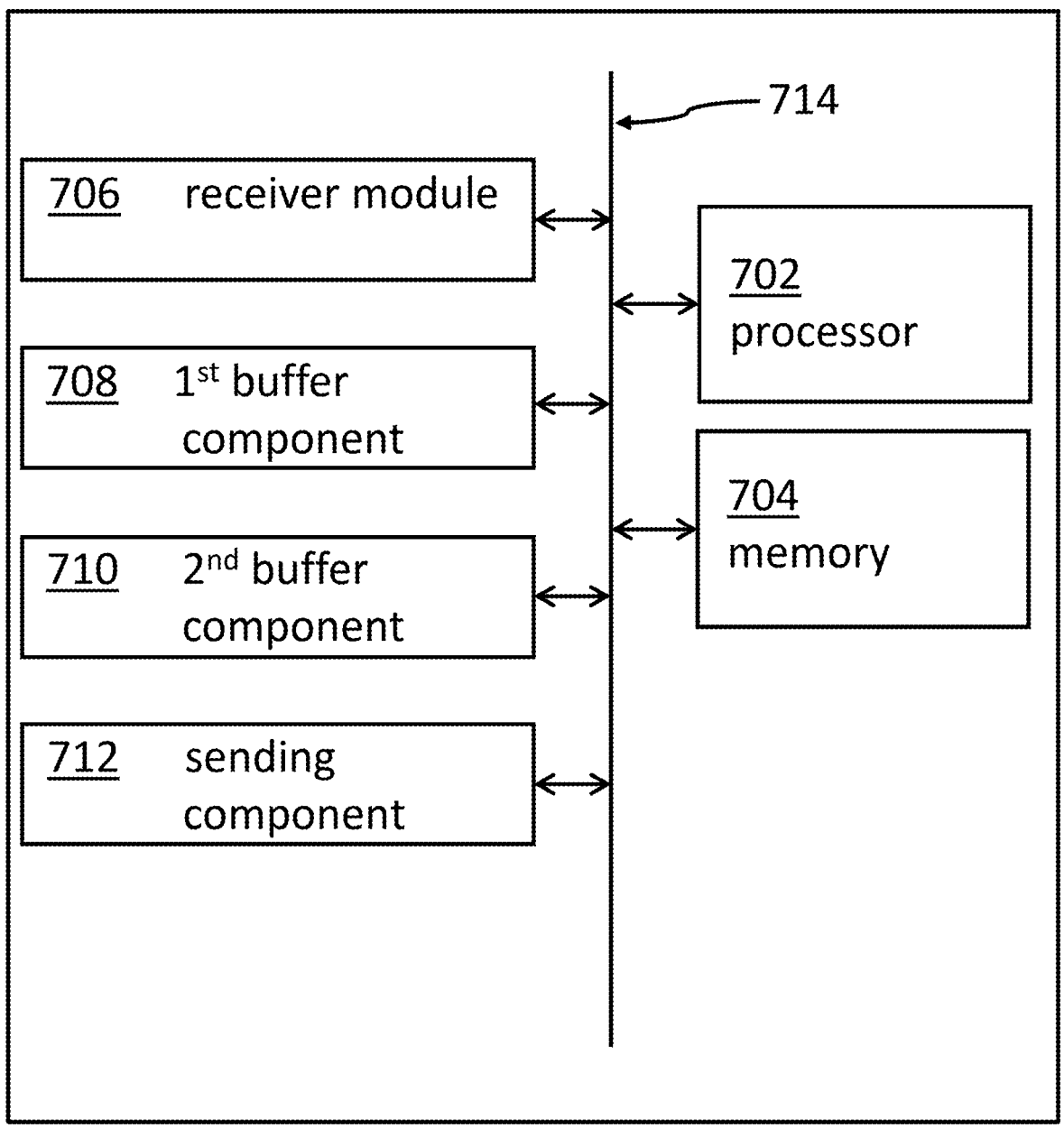

FIG. 7 shows a block diagram of an embodiment of the inventive data transfer system for facilitating large data transfers from a first data management system to a second data management system.

Figure 8:
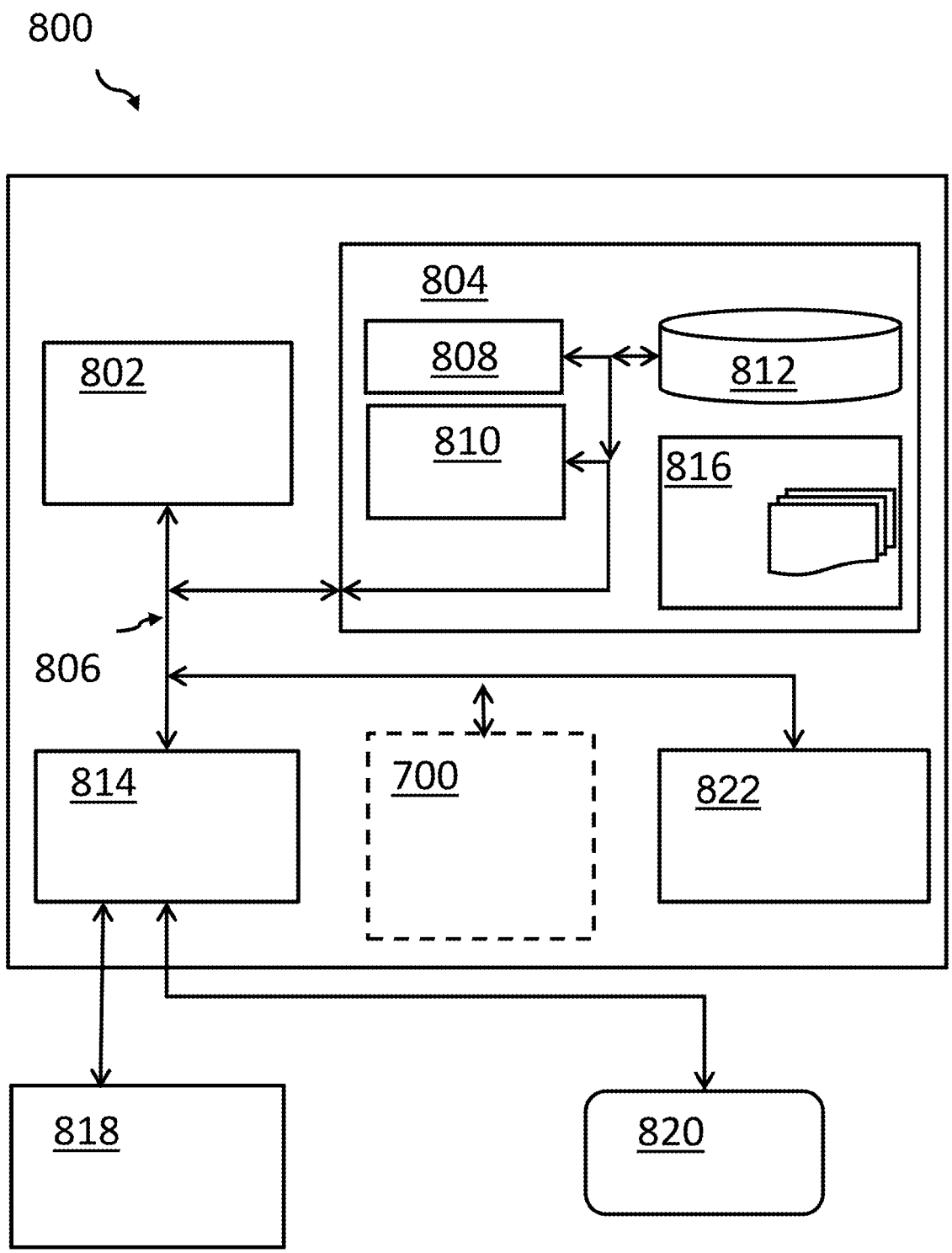

FIG. 8 shows an embodiment of a computing system comprising the system according to FIG. 7.

DETAILED DESCRIPTION

In the context of this description, the following conventions, terms and/or expressions may be used:

The term "first data management system" may denote here the accelerating data management system of a tandem comprising an accelerated data management system—in particular, an OLTP database—and a backend data management system—in particular, a database optimized for OLAP workloads.

The term "second data management system" may denote consequently the accelerated data management system, i.e., the OLTP database interfacing with applications. In case an OLAP query may be passed from an application to the OLTP database, it may be routed through to the accelerator database, i.e., the specialized database management system optimized to handle OLAP queries.

The term "large data transfer" may denote that large amounts of data may have to be transferred from one data management system to another. A typical example may be a data transfer from an OLAP database, e.g., from a query comprising, e.g., a join between tables such that not a typical small amount of data may build the result set, but a potentially unexpected large amount of data.

The term "first buffer component" may denote here a storage device adapted to receive data from a backend system from, e.g., the first data management system, using a fetcher thread. The buffer may also be denoted as convert buffer because it may intermediately store data received from the first data management system in order to convert the data into a form required for the requesting component, e.g., the second data management system. If the data flow, i.e., the data path, is only based on the first buffer component, it may be denoted as bypass mode.

The term "second buffer component" may denote—in contrast to a simpler form of the first buffer component just being a storage device—a plurality of components if the data path is not using the bypass mode. Instead, the fetcher thread does not push the received data in bypass mode directly to the convert buffer. Instead, an intermediate storage is used. For this purpose, the data may be compressed, forwarded to the spilling file write buffer, decompressed and only then pushed into the convert buffer. If the second buffer component may be used, the operation mode may be denoted as 'spilling mode'.

The term "predefined fill-level" may denote, e.g., a percentage of the convert buffer which may be occupied by data.

The term "ready for receiving the rerouted data" may denote that the convert buffer may have enough empty space to receive data. Due to delays caused by the converter threat, the send buffer and the sender threat, the convert buffer may need to have enough buffer capacity in order to receive high volume of data at high speed.

The term "sending component" may denote a combination of the converter threat reading data from the convert buffer, storing it in the send buffer and sender threat adapted for finally sending the data to the second data management system, i.e., the accelerated database management system.

In the following, a detailed description of the Figures will be given. All instructions in the Figures are schematic. Firstly, a block diagram of an embodiment of the inventive computer-implemented method for facilitating large data transfers from a first data management system to a second data management system is given. Afterwards, further embodiments, as well as embodiments of the data transfer system for facilitating large data transfers from a first data management system to a second data management system will be described.

FIG. 1 shows a block diagram of a preferred embodiment of the computer-implemented method 100 for facilitating large data transfers from a first data management system to a second data management system. The method comprises receiving, 102, data from the first data management system by a first buffer component—, e.g., comprising, in particular, a convert buffer as well as a fetcher thread—and upon the first buffer component reaching a predefined fill-level, rerouting, 104, dynamically the received data to a second buffer component, wherein the second buffer component for buffering as well as processing the rerouted data in the spillover data path. Thereby, the second buffer component is adapted to process—e.g., compress, store and decompress—the rerouted received data, in particular, as data blocks.

The method 100 comprises further forwarding, 106, by the second buffer component, the rerouted data once the first buffer component is again ready for receiving the rerouted data from the second buffer component, and sending, 108, by a sending component the data buffered in the first buffer component to the second data management system. Thereby, it can be assumed that the sending component comprises a converter thread, a send buffer, and a sender thread.

FIG. 2 shows a block diagram of an embodiment 200 of a first data management system connected to a second, accelerated data management system. The first data management system is here denoted as database accelerator 212, whereas the second database management system is shown as accelerated database management system 202 comprising database tables 204. The second DBMS is interfacing, 207, with one or more applications 206. The database accelerator 212 comprises a special database 214 (which may be optimized for OLAP transactions, like the IBM Netezza product) as well as the database adapter 218 which sends, 220, queries received, 208, from the accelerated database management system 202 to the specialized database 214 comprising tables 216. On the other side, the database adapter 218 receives, 222, result sets from the specialized database 214, and passes, 210, the data back in an expected format to the accelerated database management system 202, i.e., the second data management system. It may also be noted that the term "data management system" shall denote the more general term if compared to "database management system" which comprises a database.

In other words, an accelerated relational database system's 202 queries are executed on a database accelerator 212 to achieve a significant performance benefit on analytical query processing. Therefore, queries are offloaded to the database accelerator 212, forwarded to a specialized back-end database management system 214 that is optimized for such analytical workloads, and query results are passed back to the client application 206. This offloading must be completely transparent to the application. I.e., different behaviors of the accelerated DBMS and the backend DBMS need to be compensated by an adapter 218 (or, adapter component) that, e.g., converts result set data from the backend format to the format that it is expected by client applications.

Typical analytical query result sets are meant to be stored and used by a consumer (application) without additional complex post-processing analysis steps. The accelerator server application, which acts as an adapter for the backend database, converts and forwards the data and is optimized for the processing of such small result sets, which usually only comprise a few rows. However, as described in the "background" section, a scenario with a large result set may become a reality and may require special attention and optimized functionality of the database adapter 218.

FIG. 3 shows an overview block diagram of an embodiment 300 of general functional blocks of the database adapter 218 between the first data management system 212 and second data management system 202 (compare FIG. 2). The shown data pipeline in the database adapter 218 application includes the spilling logic for all queries, irrespective of their fetching behavior. This avoids the cumbersome configuration of spill-to-disk heuristics that should be applied by the accelerator server application. It does also apply asynchronous processing to the entire spilling logic. This hides access latency in case a query starts spilling by overlapping spilling phases with the other processing stages. Then, the spilling logic is pushed back towards the backend database so that unconverted rows are spilled. This would save processing resources for unnecessary conversion operations and this will accelerate the spilling process because rows can be spared files too and, therefore, backend database resources can be released earlier in case the convergence is applied to the spilling.

In detail, the data, i.e., the result set rows and backend format, are fetched, 302, from the first data management system 212. In case of a large-result-set scenario, the data are not passed directly to the convert buffer 304 in bypass mode but is immediately stored on a local disk 312 in a spilled file queue 314. The decision for using either the bypass mode or the spill-to-disk mode is made by the fetcher thread (302, fetch). After a conversion (306, convert) the result set rows have been transformed into expected client format and pushed to a send buffer 308. From here, it is sent, 310, to the second data management system 202. The backwards oriented arrow 312 may indicate that a loop process is repeated chunk-wise until all result set rows, received from the first data management system 212 are done.

FIG. 4 shows a block diagram of an embodiment 400 of more detailed functional blocks of a portion of the DB adapter (218, compare FIG. 2) between the first 212 and second data management system 202. The fetcher thread 402 may either decide to use the bypass mode 430 and send the data directly to the convert buffer 420 or to activate the spill mode. It should be noted that the fetcher thread 402 and the convert buffer 420, i.e., the first buffer component, build a close relationship. The fetcher thread 402 builds the link between then backend system and the device-like first buffer component.

However, if the convert buffer 420 is not ready to receive additional data from the fetcher thread 402—e.g., because the predefined fill rate has been reached or because a data-out transfer rate is not high enough—the fetcher thread 402 is using the spilling mode, starting at 428. Here, the data path comprises the compression buffer 404, a compressor thread 406, a spilling file write buffer 408, a spilling file writer thread 410, a spilling file queue 412, a spilling file reader thread 414, a decompression buffer 416, a decompressor threat 418 and finally, also the convert buffer 420. Additionally, the potentially required sequence of the query result set may also play a decision role for the decision of the fetcher thread 402. If a sequence is required—e.g., because of a query comprising " . . . ORDER BY . . . " —all query results rows of the related query should use the same mode.

In other words, the result set rows are fetched in the backend format from the backend database (i.e., first data management system 212) by the fetcher thread 402. In contrast to existing implementations, the rows are not yet converted by the converter thread but are processed by the spilling-components. This avoids configuring spilling heuristics and avoids spending processing resources converting result set rows in case the result set is discarded before it has been fully fetched. The rows in backend format are grouped two blocks inside the compression buffer 404. A compressor thread 406 accepts those blocks, optionally compresses them by applying known compression techniques, such as dictionary encoding, run-length encoding, or heavy-weight zip compression and forwards the compressed blocks to the spill file write buffer 408. From there, the blocks are written to the disk-based spill file queue 412 by the spill file write data thread 410. The spilling file reader thread 414 de-serializes compressed blocks back into memory and puts them into the decompression buffer 416 were a decompressor thread 418 applies the corresponding decompression algorithm for storing the rows in backend format.

Then, the blocks of rows are converted by the converter thread 422 into the expected client format and a sender thread 426 sends them from the send buffer 424 to the client application (compare 206, FIG. 2) via the database accelerators network connection and via the second data management system (compare 202, FIG. 2).

FIG. 5 shows a block diagram of an embodiment of the parallel executing data path 500—i.e., the serial and asynchronous result set fetching mechanism with a spill-to-disk function—in accordance with the proposed concept. The time for the serial fetching—expressed by the first row of blocks 502a, . . . , 506c is time-wise moving forward from right to left. The serial formatting comprises the sequence of fetch B1 (block 1 of data), convert B1, send B1, fetch B2, convert B2, send B2, fetch B3, convert B3, and send B3.

However, in the asynchronous fetching with spill-to-disk, the blocks B1, B2, B3 are processed in parallel and interleaved. The first row 502 of blocks representing fetch B1, fetch B2, fetch B2 is executed without delay by the fetcher threat 402 (compare FIG. 4). Subsequently, the compressor thread 406, the spilling file writer thread 410, the spilling file reader thread 414, the decompressor thread 418, the converter thread 422 and the sender thread 426 handle the blocks as shown: compress (508) B1, 508a, compress B1, 508b, compress B1, 508c; serialize B1, 510a, serialize B2, 510b, serialize B3, 510c; deserialize B1, 512a, deserialize B2, 512b, deserialize B3, 512c; decompress B1, 514a, decompress B2, 514b, decompress B3, 514c; convert B1, 5046a, convert B2, 504b, convert B3, 504c; and, send B1, 506a, send B2, 506b, send B3, 506c.

Hence, this figure illustrates the overlapping processing phases and shows how the parallel execution phases (i.e., in spilling mode) hide access latency when rows are fetched from the client compared with a series execution (i.e., bypass mode). It should be noted that there is a ramp-up phase between sending of blocks 1 and 2 in the serial and the asynchronous case. If the bypass optimization is applied, this latency can be avoided. The enhanced processing pipeline just requires buffer sizes and the to-be-applied compression algorithm as parameters. Both values can be determined much easier than the current traditional configuration.

In the following, some special cases, should be considered: ordered query results, queries without specified result set ordering, result set compression and spill file organization.

Ordered Query Results: Writing result set rows to spill files is only required when both conditions apply: (1) The results set is larger than the (pre-allocated) internal memory buffers for processing them; (2) the client application is fetching rows at a lower rate than they are produced by the accelerator.

Therefore, as illustrated in FIG. 5, the fetcher thread may omit the spilling part of the pipeline in case the convert buffer is not filled. That is, when the pipeline starts, fetched result set rows can be directly written into the convert buffer so that the converter thread can start working immediately. This avoids the initial access latency during the ramp-up phase of the pipeline (compare FIG. 5).

Once the convert buffer overflows, which will happen in case the client application is fetching slowly and the result set is sufficiently large, the spilling may start so that result set rows are drained as fast as possible from the backend database. The previously discussed asynchronous processing will guarantee that spilling is executed as background operation and the convert buffer is filled as soon as the next chunk of rows have been fetched by the client, e.g., for interactive page-wise result set browsing use cases.

The spilling overheads will not be observable from a client perspective if the hardware is properly sized, i.e., disk I/O bandwidth are sufficiently high for writing blocks and reading blocks from the spill files and there are sufficient CPU resources for compressing data at high throughputs. The hardware configuration can be determined during development time as it does not depend on the client's workload. Therefore, no workload-dependent heuristics, e.g., the number of concurrent query tasks or delays until the triggering of spilling need to be configured.

The buffer size can be adjusted to control which query qualifies for spilling. In practice, some MBs (megabyte) are sufficient for real-world scenarios and a preconfigured default value is suitable for most use cases. For tuning the behavior of a particular client, the sizes may easily be increased by determining the maximum result set size, which is a query-specific property and does not depend on scheduling order of multiple queries.

Queries without Specified Result Set Ordering: It should be noted that, in general, the asynchronous fetching pipeline needs to maintain the order of result blocks. I.e., once a block has been written to the spill file it has to be converted before any subsequently fetched one. Therefore, the bypass mode may only be used when the spill file is empty, either in the initialization phase or when all previously spilled blocks have already been used up.

An additional optimization can be applied for the special case where the query does not require a particular ordering of result set rows, i.e., when there is no ORDER BY clause inside the query statement. This can either be determined on query start or asynchronously while the query is running, enabling the optimization once the analysis result is ready.

If no ordering constraint is specified, the database system is allowed to return result set rows in any order. This can be utilized for triggering the bypass mode as soon as there is available space in the convert buffer. In this case, the fetcher thread can directly write to the convert buffer without the need to synchronize with previously spilled blocks. This optimization is particularly useful in case the spilling pipeline processes rows at a slower rate than the client fetches them, e.g., due to hardware constraints when the available processing and I/O bandwidth is limited by many parallel queries.

Result Set Compression: Compressing result set data before writing it to spill files is an optional operation that can be configured via a global accelerator server parameter. In case no compression should be used, the (de-)compressor threads simply forward the blocks to the subsequent stage without modifying them. When compression is enabled, additional CPU resources will be spent for reducing I/O times and file system usage.

Algorithms that achieve high compression levels may require more CPU resources for (de-) compressing blocks of result set rows but increase the scalability of the whole accelerator system because more data can be stored on local disks. Therefore, a tradeoff has to be determined, which can be done by calibrating the accelerator before deploying it in production environments. By default, moderate compression levels should be chosen, which leads to reduced disk space and sufficiently fast (de-)compression throughputs so that the convert buffer can be filled at faster rate than it is consumed.

Spill File Organization: For the general query processing use case that requires result set ordering, the spill file queue should be organized as disk-based FIFO (First-In-First-Out) data structure. File systems usually do usually not support this operation natively, which requires reading and freeing data blocks at the consumer end and allocating and writing data blocks at the producer end.

In order to solve this, several implementation techniques can be applied, for example: (i) The result set may be spilled to an append-only file that is freed once the entire result set has been consumed; (ii) the result set may be spilled to a random-access file where FIFO operations are modeled by in-memory index structures, i.e., the location of a particular block within the spill file is tracked so that it can be directly read/overwritten by offset calculation; and (iii) the result set may be spilled to a set of append-only files that are managed with a FIFO access pattern internally.

The append-only file is simple to implement and causes the lowest management overhead because blocks can be appended to the end of the file and are consumed from the beginning. The read-write offsets must be synchronized by spill file reader and writer threads. The FIFO access pattern that is applied to the whole file results in sequential I/O operations which yields best I/O throughputs for most disk devices. However, disk space can only be reclaimed once the entire file has been consumed.

The random-access file requires detailed tracking of each result set block to determine where it is stored. This may cause the highest management overheads due to the indirect lookup of each block address. The random-access pattern is also typically only supported by some disk technologies, e.g., solid state disks. In most cases, sequential access operations yield higher I/O performance. Further, random block access requires that all blocks are of equal size, which is not guaranteed if compression algorithms are applied to reduce block sizes. Otherwise, additional free-space maps need to be maintained to find a suitable place for a to-be-spilled block by overwriting a previously read block.

The set-based spill file management (compare FIG. 6) represents the best solution for most hardware configurations. The spill file is partitioned into a set of append-only spill files having a fixed maximum size. Newly spilled blocks are appended to the last file that is open for writing as long as its capacity is not reached. Once a block needs to be read, the corresponding spill file switches to read-only mode and its blocks can be consumed one after another until all blocks have been read. Once all blocks have been consumed, the entire file can be freed on disk—before the result set has been completely fetched. This spill file implementation further simplifies synchronization between reader and writer threads because each file in the set can be independently processed. Further optimization can be applied in the event that blocks are used up faster than they are written, e.g., when a previously slow-fetching client fetches fast now because the next batch of data is requested. If all spill files are exhausted, the reader can steal the currently written spill file before it reaches its capacity. This force-flushing ends a spilling phase and allows restarting the bypass mode.

Hence, FIG. 6 shows a block diagram 600 of the FIFO spill file set according to a possible implementation. In the spill file queue 602, the spill file blocks are ordered according to the block age. Also, the read sequence 618 as well as the write sequence 620 are shown symbolically. The currently read spill file r 604 comprises the blocks Br1, . . . Brn. From here, the next block is read and the file is freed after all blocks have been consumed by the spilling file reader thread 614 (compare 414, FIG. 4). The spill file 606—with blocks B11, . . . , B1n—to 608—with blocks Bi1, . . . Bin—represent ready-to-read file blocks 624 with a capacity of n blocks each.

The currently written spill file w 612 comprises the blocks Bw1, . . . , Bwx. A next block is appended and allocated to a new file if the capacity of the convert buffer is reached by the spilling file writer thread 616 (compare also 408, FIG. 4). The connection 622 illustrates that the last file is stolen if previous files are exhausted and the bypass mode is triggered.

FIG. 7 shows a block diagram of an embodiment of the inventive data transfer system 700 for facilitating large data transfers from a first data management system to a second data management system. The system comprises a processor 702 and a memory 704 communicatively coupled to the processor, wherein the memory stores program code portions that, when executed, enable the processor to receive—in particular, by a receiver module 706—data from the first data management system by a first buffer component 708, and, upon the first buffer component 708 reaching a predefined fill-level, reroute dynamically the received data to a second buffer component 710, wherein the second buffer component 710 is adapted to process the rerouted received data.

Additionally, the processor 702, when executing the stored program code portions, is enabled to forward, by the second buffer component, the rerouted data once the first buffer component is again ready for receiving the rerouted data from the second buffer component, and to send, by a sending component 712, the data buffered in the first buffer component 708 (equivalent to 420, FIG. 4) to the second data management system.

It shall also be mentioned that all functional units, modules and functional blocks—in particular, the processor 702, the memory 704, the receiver unit 706, the first buffer component 708, the second buffer component 710, and the sending component 712—may be communicatively coupled to one another for signal or message exchange in a selected 1:1 manner. Alternatively, the functional units, modules and functional blocks can be linked to a system internal bus system 714 for a selective signal or message exchange.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the data transfer system 700 for facilitating large data transfers from a first data management system to a second data management system may be attached to the bus system 806.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and, the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Embodiments of the present invention may be summarized by the following clauses:

A computer-implemented method for facilitating large data transfers from a first data management system to a second data management system is provided. The method comprises receiving data from the first data management system by a first buffer component; rerouting, upon the first buffer component reaching a predefined fill-level dynamically the received data to a second buffer component, wherein the second buffer component is adapted to process the rerouted received data; forwarding, by the second buffer component, the rerouted data once the first buffer component is again ready for receiving the rerouted data from the second buffer component; and sending, by a sending component, the data buffered in the first buffer component to the second data management system.

According to the previous clause, the first data management system is optimized for analytical workload.

According to either of the previous clauses, the second data management system is adapted for receiving queries from a software application.

According to any of the preceding clauses, the processing of the rerouted received data by the second buffer component comprises at least one activity selected out of the group consisting of compressing the rerouted received data, storing the compressed rerouted received data, and decompressing the rerouted received data.

According to the preceding clause, the compressing, storing, and decompressing the rerouted received data is performed by one or more processing threads in an interleaved manner for packets of the rerouted received data.

According to the preceding clause, the one or more processing threads of the second buffer component are idle while not receiving any rerouted received data from the first buffer component.

According to any of the preceding clauses, the first buffer component is adapted to convert the received data according to predefined requirements of the second data management.

According to any of the preceding clauses, the second data management system is a row-oriented relational database system.

According to any of the preceding clauses, the first data management system is a column-oriented database management system.

According to any of the preceding clauses, the method further comprises determining a data rate of data being transferred out of the first buffer component for a determination whether the first buffer component is again ready for receiving the rerouted data from the second buffer component.

According to any of the preceding clauses a sequence of data being transferred out of the first buffer component is compliant with a query having triggered the receiving data from the first data management system by a first buffer component.

According to any of the preceding clauses, the second buffer component comprises a data path comprising at least one component out of a group comprising a compression buffer, a compressor thread, a spilling file write buffer, a spilling file writer thread, a spilling file queue, a spilling file reader thread, a decompression buffer, and a decompressor thread.

A data transfer system for facilitating large data transfers from a first data management system to a second data management system is provided, comprising a processor and a memory communicatively coupled to the processor, wherein the memory stores program code portions that, when executed, enable the processor to receive data from the first data management system by a first buffer component adapted; reroute, upon the first buffer component reaching a predefined fill-level, dynamically the received data to a second buffer component, wherein the second buffer component is adapted to process the rerouted received data; forward, by the second buffer component, the rerouted data once the first buffer component is again ready for receiving the rerouted data from the second buffer component; and send, by a sending component, the data buffered in the first buffer component to the second data management system.

According to the previous system clause, the first data management system is optimized for analytical workload.

According to either of the preceding two system clauses, the second data management system is adapted for receiving queries from a software application.

According to any of the preceding system claims, the processing of the rerouted received data by the second buffer component comprises at least one activity selected out of a group consisting of compressing the rerouted received data, storing the compressed rerouted received data, and decompressing the rerouted received data.

According to the any of the preceding system clauses, the compressing, storing and decompressing the rerouted received data is performed by one or more processing threads in an interleaved manner for packets of the rerouted received data.

According to the previous system clause, the one or more processing threads of the second buffer component are idle while not receiving any rerouted received data from the first buffer component.

According to any of the preceding system clauses, the first buffer component is adapted to convert the received data according to predefined requirements of the second data management system.

According to any of the preceding system clauses, the second data management system is a row-oriented relational database system.

According to any of the preceding systems clauses, the first data management system is a column-oriented database management system.

According to any of the preceding systems clauses, the processor, when executing the program code, is also enabled to determine a data rate of data being transferred out of the first buffer component for a determination whether the first buffer component is again ready for receiving the rerouted data from the second buffer component.

According to any of the preceding system claims, a sequence of data being transferred out of the first buffer component is compliant with a query having triggered the receiving data from the first data management system by the first buffer component.

According to any of the preceding system claims, the second buffer component comprises a data path comprising at least one component out of the group comprising a compression buffer, a compressor thread, a spilling file write buffer, a spilling file writer thread, a spilling file queue, a spilling file reader thread, a decompression buffer, and a decompressor thread.

A computer program product for facilitating large data transfers from a first data management system to a second data management system is provided. The computer program product comprises a computer readable storage medium having program instructions embodied therewith, the program instructions being executable by one or more computing systems or controllers to cause the one or more computing systems to receive data from the first data management system by a first buffer component; reroute, upon the first buffer component reaching a predefined fill-level, dynamically the received data to a second buffer component, wherein the second buffer component is adapted to process the rerouted received data; forward, by the second buffer component, the rerouted data once the first buffer component is again ready for receiving the rerouted data from the second buffer component; and send, by a sending component, the data buffered in the first buffer component to the second data management system.

What is claimed is:

1. A computer-implemented method for facilitating large data transfers from a first data management system to a second data management system, the method comprising:
receiving data from the first data management system by a first buffer component;
rerouting, upon the first buffer component reaching a predefined fill-level, dynamically the received data to a second buffer component, wherein the second buffer component is adapted to process the rerouted received data;
forwarding, by the second buffer component, the rerouted data once the first buffer component is again ready for receiving the rerouted data from the second buffer component; and
sending, by a sending component, the data buffered in the first buffer component to the second data management system.

2. The method according to claim 1, wherein the first data management system is optimized for analytical workload.

3. The method according to claim 1, wherein the second data management system is adapted for receiving queries from a software application.

4. The method according to claim 1, wherein the processing of the rerouted received data by the second buffer component comprises at least one activity selected out of a group consisting of compressing the rerouted received data, storing the compressed rerouted received data, and decompressing the rerouted received data.

5. The method according to claim 4, wherein the compressing, storing, and decompressing the rerouted received data is performed by one or more processing threads in an interleaved manner for packets of the rerouted received data.

6. The method according to claim 5, wherein the one or more processing threads of the second buffer component are idle while not receiving any rerouted received data from the first buffer component.

7. The method according to claim 1, wherein the first buffer component is adapted to convert the received data according to predefined requirements of the second data management.

8. The method according to claim 1, wherein the second data management system is a row-oriented relational database system.

9. The method according to claim 1, wherein the first data management system is a column-oriented database management system.

10. The method according to claim 1, further comprising:
determining a data rate of data being transferred out of the first buffer component for a determination whether the first buffer component is again ready for receiving the rerouted data from the second buffer component.

11. The method according to claim 1, wherein a sequence of data being transferred out of the first buffer component is compliant with a query having triggered the receiving data from the first data management system by the first buffer component.

12. The method according to claim 1, wherein the second buffer component comprises a data path comprising at least one component out of the group comprising a compression buffer, a compressor thread, a spilling file write buffer, a spilling file writer thread, a spilling file queue, a spilling file reader thread, a decompression buffer, and a decompressor thread.

13. A data transfer system for facilitating large data transfers from a first data management system to a second data management system, the system comprising:
a processor and a memory communicatively coupled to the processor, wherein the memory stores program code portions that, when executed, enable the processor to:
receive data from the first data management system by a first buffer component;
reroute, upon the first buffer component reaching a predefined fill-level, dynamically the received data to a second buffer component, wherein the second buffer component is adapted to process the rerouted received data;

forward, by the second buffer component, the rerouted data once the first buffer component is again ready for receiving the rerouted data from the second buffer component; and send, by a sending component, the data buffered in the first buffer component to the second data management system.

14. The system according to claim 13, wherein the first data management system is optimized for analytical workload.

15. The system according to claim 13, wherein the second data management system is adapted for receiving queries from a software application.

16. The system according to claim 13, wherein the processing of the rerouted received data by the second buffer component comprises at least one activity selected out of a group consisting of compressing the rerouted received data, storing the compressed rerouted received data, and decompressing the rerouted received data.

17. The system according to claim 16, wherein the compressing, storing and decompressing the rerouted received data is performed by one or more processing threads in an interleaved manner for packets of the rerouted received data.

18. The system according to claim 17, wherein the one or more processing threads of the second buffer component are idle while not receiving any rerouted received data from the first buffer component.

19. The system according to claim 13, wherein the first buffer component is adapted to convert the received data according to predefined requirements of the second data management system.

20. A computer program product for facilitating large data transfers from a first data management system to a second data management system, the computer program product comprising a computer readable storage medium having program instructions embodied therewith, the program instructions being executable by one or more computing systems or controllers to cause the one or more computing systems to:

receive data from the first data management system by a first buffer component;

reroute, upon the first buffer component reaching a predefined fill-level, dynamically the received data to a second buffer component, wherein the second buffer component is adapted to process the rerouted received data;

forward, by the second buffer component, the rerouted data once the first buffer component is again ready for receiving the rerouted data from the second buffer component; and send, by a sending component, the data buffered in the first buffer component to the second data management system.

* * * * *